United States Patent
Brown et al.

[11] Patent Number: 6,164,437
[45] Date of Patent: Dec. 26, 2000

[54] INDEXING DRIVE

[75] Inventors: Gerald A. Brown, Roseville; Jason A. McNamara, Wyandotte; Jeffrey S. McNamara, Grosee Ile; Donald D. Pagels, Jr., Grosee Pointe Woods, all of Mich.

[73] Assignee: Unova IP Corp., Woodland Hills, Calif.

[21] Appl. No.: 09/270,985

[22] Filed: Mar. 17, 1999

[51] Int. Cl.⁷ .................................................. B65G 23/00
[52] U.S. Cl. ............................................................. 198/832.1
[58] Field of Search .................................. 198/832.1, 832

[56] References Cited

U.S. PATENT DOCUMENTS

| | | | |
|---|---|---|---|
| 449,595 | 3/1891 | Smith et al. | 198/832.1 X |
| 1,140,297 | 5/1915 | Brown | 198/832.1 |
| 1,651,243 | 11/1927 | Baker | 198/832.1 X |
| 3,241,656 | 3/1966 | Thornton | 198/832.1 X |
| 3,263,316 | 8/1966 | Schrader | 198/832.1 X |
| 3,834,521 | 9/1974 | Rauch et al. | 198/832.1 |
| 4,048,868 | 9/1977 | Lock | 198/832.1 X |
| 5,058,723 | 10/1991 | Hosch | 198/832.1 X |

FOREIGN PATENT DOCUMENTS

| | | | |
|---|---|---|---|
| 1284906 | 1/1987 | U.S.S.R. | 198/832.1 |
| 2085832 | 5/1982 | United Kingdom . | |

*Primary Examiner*—Robert P. Olszewski
*Assistant Examiner*—Thuy V. Tran
*Attorney, Agent, or Firm*—Reising, Ethington, Barnes, Kisselle, Learman & McCulloch, P.C.

[57] ABSTRACT

An indexing drive has an actuator which reciprocates a ratchet arm along an arcuate path to cause an indexed rotation of rollers during one direction of movement of the ratchet arm which bear on a follower to produce an associated indexed rotation of the follower which may be communicated with a drive mechanism of apparatus to provide an indexed movement of the apparatus. Desirably, when the follower is not being rotated by the rollers, it is restrained from rotation in either direction to prevent movement of the drive mechanism to which it is connected and hence, to prevent movement of the apparatus associated with the drive mechanism.

19 Claims, 4 Drawing Sheets

INDEXING DRIVE

FIELD OF THE INVENTION

This invention relates generally to a drive mechanism and more particularly to an indexing drive providing a discrete, intermittent output.

BACKGROUND OF THE INVENTION

Various transfer mechanisms are indexed to move a work piece or work tool from one work station to another in an intermittent and repeating manner. For instance, an indexing conveyor may have a plurality of pallets spaced thereon which are moved intermittently to consecutive work stations. Thus, the conveyor is intermittently driven discrete distances to align or index the pallets with the various work stations.

Especially with relatively long indexing conveyors, a significant momentum or inertia is generated when the conveyor is moving such that it is very difficult to accurately stop the conveyor. Further, once stopped the conveyor may apply reactive forces to the drive mechanism causing it to shift from its desired position. Prior drives used for indexing conveyors include electromechanical or multiple cylinder pneumatic devices which are expensive, unreliable and are unable to accurately stop and thereafter hold the position of the conveyor.

SUMMARY OF THE INVENTION

An indexing drive has an actuator which moves a ratchet arm in a pair of opposed directions to cause an indexed rotation of rollers during one direction of movement of the ratchet arm causing the rollers to bear on and cause an associated indexed rotation of a follower which may be communicated with a drive mechanism of an apparatus to cause an indexed movement of the apparatus. Desirably, when the follower is not being rotated by the rollers, it is restrained from rotation in either direction to prevent movement of the drive mechanism to which it is connected and hence, to prevent movement of the apparatus associated with the drive mechanism.

Preferably, four rollers are provided generally equally circumferentially spaced on a drive wheel fixed to a main shaft which is rotated by movement of the ratchet arm in one direction through an index stroke. The follower has slots formed therein and in which at least one roller is at least partially received at all times to prevent movement of the follower without an associated movement of the drive wheel. After an index stroke of the ratchet arm causing rotation of the main shaft, the drive wheel and follower are angularly positioned so that two rollers are preferably engaged with the follower such that forces tending to rotate the follower act on the rollers along lines generally perpendicular to the axis of rotation of the shaft to prevent rotation of the follower when not driven by the rollers on the drive wheel. Also preferably, a detent mechanism restrains movement of the drive wheel when the ratchet arm is not moving through its index stroke to maintain the desired angular position of the drive wheel and follower.

Desirably, the actuator may be a single pneumatic cylinder providing a relatively inexpensive and simple indexing drive. Further, with the rollers positioned to prevent rotation of the follower when it is not being driven by the rollers, the indexing drive may be accurately stopped and held in a desired position to provide accurate, discrete units of movement such as for driving pallets on an indexing conveyor to consecutive work stations.

Objects, features and advantages of this invention include providing an indexing drive which may be used to intermittently drive an apparatus to accurately move and stop the driven apparatus, prevent movement of the driven apparatus when desired and which may be powered by a single pneumatic cylinder, is of relatively simple design and economical manufacture and assembly, is reliable, durable and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
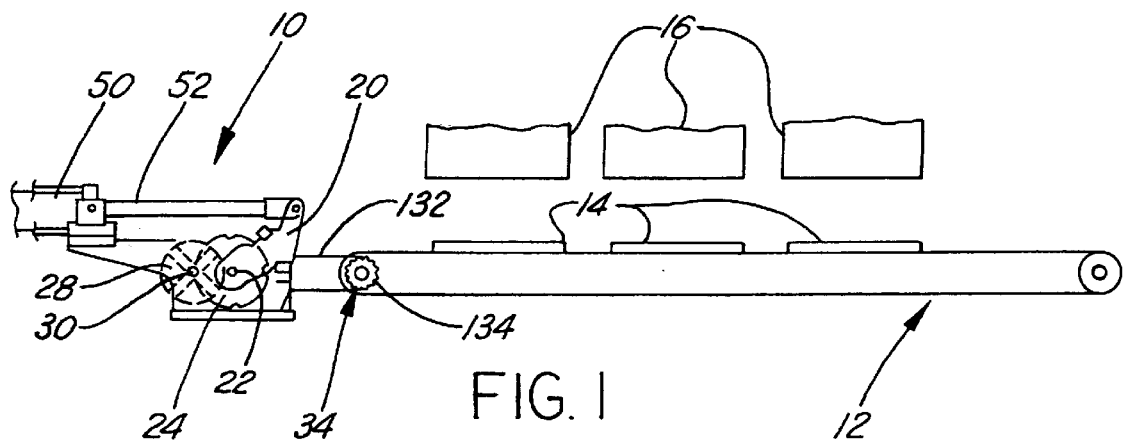
FIG. 1 is a diagrammatic view illustrating an indexing drive embodying the present invention and connected to an indexing conveyor to drive the conveyor.

Referring in more detail to the drawings, FIG. 1 illustrates an indexing drive 10 which intermittently advances a conveyor 12 to move pallets 14 on the conveyor 12, and any work pieces received on the pallets 14, relative to consecutive work stations 16. When not driving or advancing the conveyor 12, the indexing drive 10 resists movement of the conveyor 12 to maintain accurate positioning of the pallets and work pieces relative to the work stations 16. The indexing drive 10 has at least one and preferably a pair of ratchet arms 20 (FIG. 2) driven between first and second positions to selectively rotate a main shaft 22 on which a drive wheel 24 is fixed. Rollers 26a–26d (FIGS. 2–5) on the drive wheel 24 engage a follower wheel 28 to rotate it, an output shaft 30 affixed thereto and an output gear 32 (FIGS. 2–4) fixed to the output shaft 30 and operably connected with a drive mechanism 34 of the conveyor 12 to drive the conveyor 12.

Figure 2:
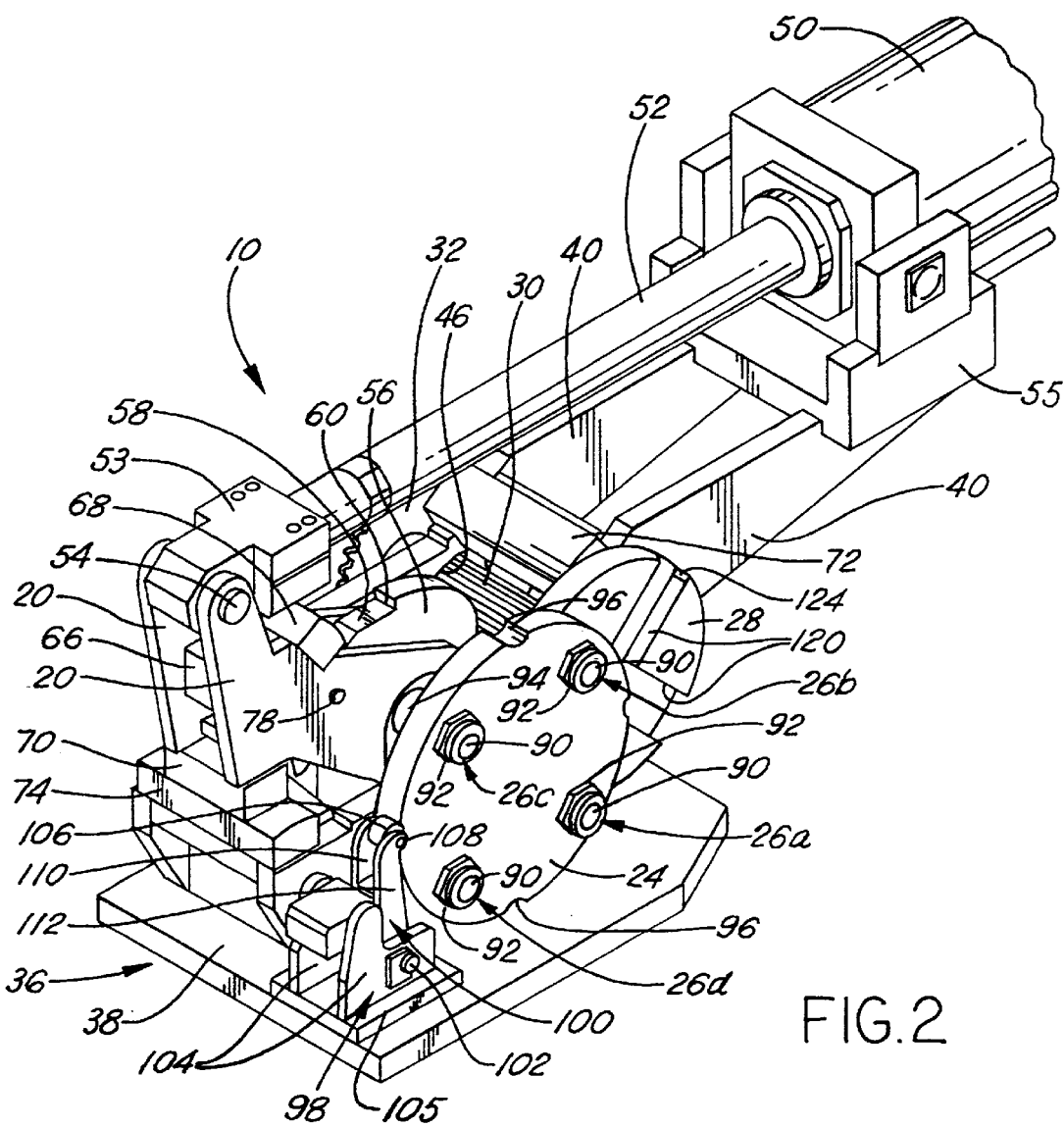
FIG. 2 is a perspective view of an indexing drive embodying the present invention.
Figure 3:
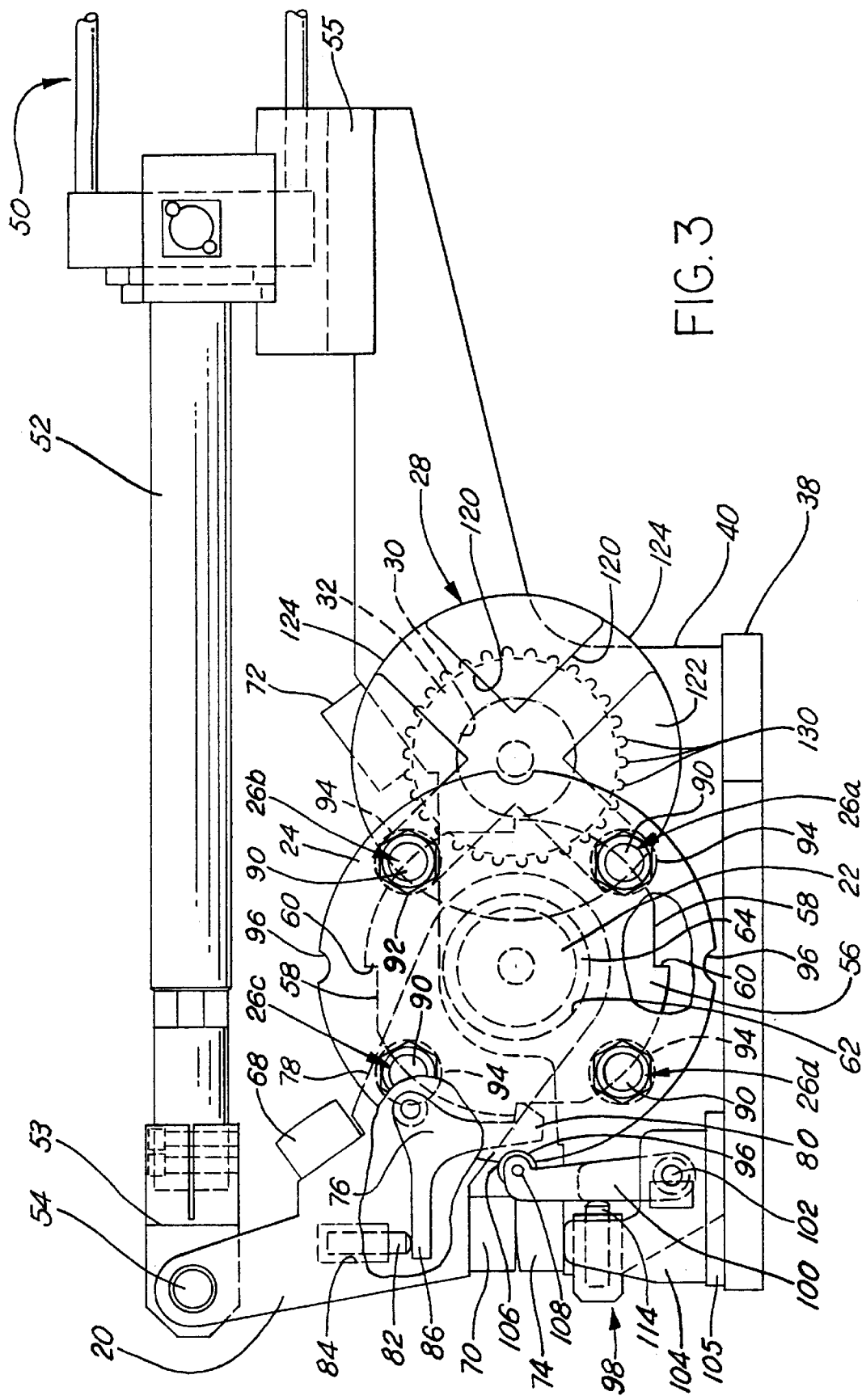
FIG. 3 is a side view of the indexing drive of FIG. 2 shown in a first position, prior to an index stroke.
Figure 4:
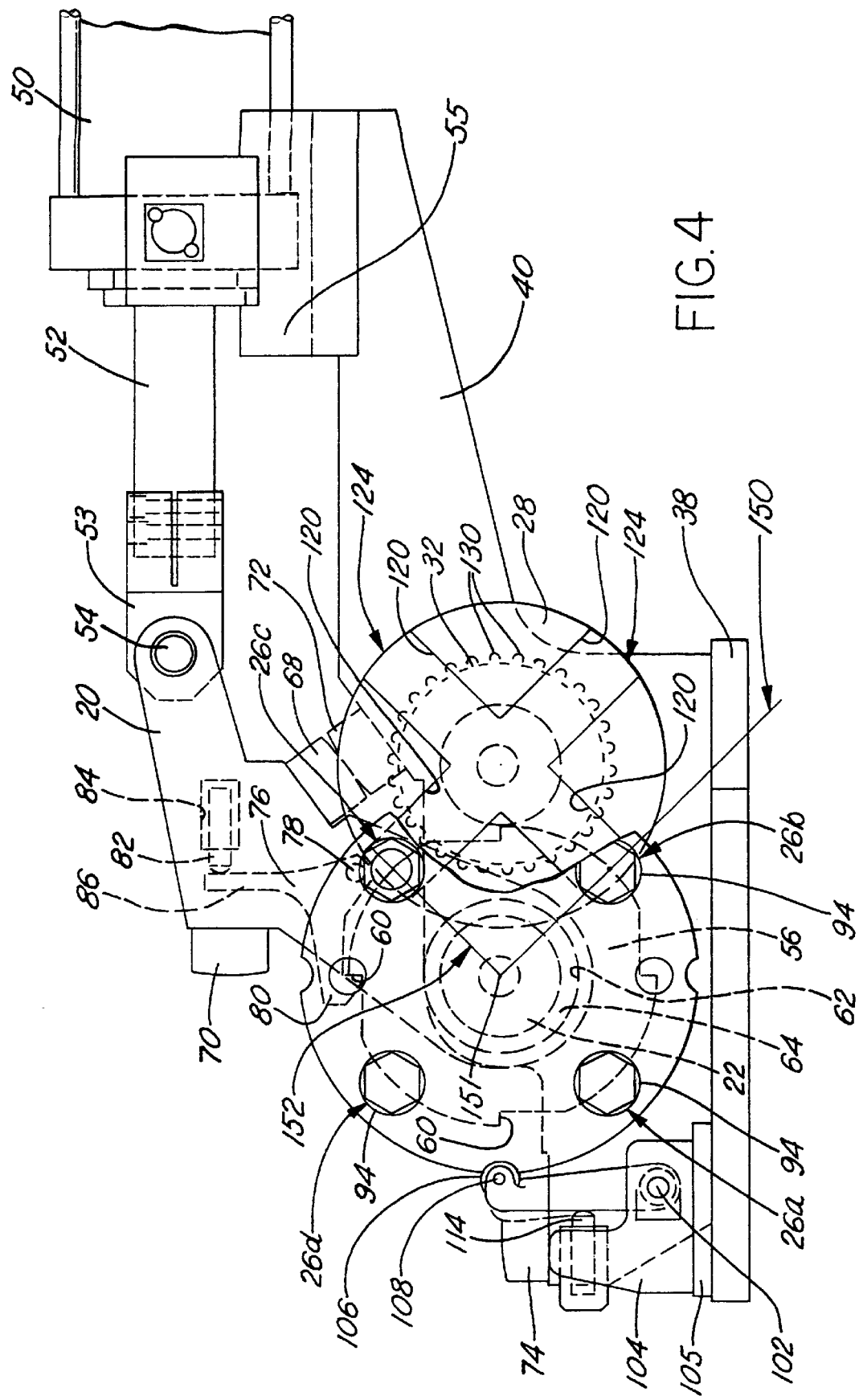
FIG. 4 is a side view of the indexing drive of FIG. 2 shown in a second position, after an index stroke.

As shown in FIGS. 2–4, the indexing drive 10 has a frame 36 with a base 38 and a pair of spaced apart, generally parallel rails or uprights 40. Each upright 40 has a bore (not shown) through which the main shaft 22 of the indexing drive 10 is received. Bearings received over the main shaft 22 and within the bores journal the main shaft 22 for rotation relative to the uprights 40. Similarly, the output shaft 30 extends through bores 46 through the uprights 40 of the frame 36 and bearings (not shown) received within these bores 46 and over the output shaft 30 journal the output shaft 30 for rotation relative to the uprights 40. The axis of the output shaft 30 is disposed parallel to and spaced from the axis of the main shaft 22 and is preferably the same height from the base 38 as the main shaft 22.

The ratchet arms 20 are driven between their first and second or extended and retracted positions by an actuator 50 such as a pneumatic cylinder with an actuating rod 52, which is pivotally connected to the ratchet arms 20 by a connecting block 53 and pivot pin 54. The pivotal connection between the actuating rod 52 and the ratchet arms 20 permits the ratchet arms 20 to swing in an arc to rotate the main shaft 22 when driven by the essentially linear movement of the actuating rod 52. The cylinder is pivotally mounted on the uprights 40 by trunnions journalled in a block 55 fixed to the uprights 40.

A ratchet wheel 56 is fixed to the main shaft 22 between the uprights 40 for co-rotation with the main shaft 22. The ratchet wheel 56 is preferably generally circular and coaxially mounted with the main shaft 22. Recesses or notches 58 formed about the periphery of the ratchet wheel 56 define four teeth 60 which are equally circumferentially spaced from one another and equally radially spaced from the axis of rotation of the ratchet wheel 56. Alternatively, the teeth 60 may extend outwardly from the ratchet wheel 56 rather than being formed by a recess in the ratchet wheel 56.

To intermittently drive the main shaft 22 for rotation, the ratchet arms 20 are carried by the frame 36 and journalled on the main shaft 22 for rotation relative to the main shaft 22. One ratchet arm 20 is preferably disposed on each side of the ratchet wheel 56, and each ratchet arm 20 has a bore 62 through which bearings 64 on the main shaft 22 are received to journal the ratchet arms 20 for rotation relative to the main shaft 22. The ratchet arms 20 are driven in unison and are preferably connected together by a block 66 (FIG. 2) received between them and fixed to them such as by welding. To limit the extent of rotational movement of the ratchet arms 20, a pair of stops 68, 70 are fixed to the ratchet arms 20 and are constructed to engage opposing stops 72, 74 fixed on the uprights 40 of the frame 36.

As shown in FIGS. 3 and 4 to selectively engage the teeth 60 of the ratchet wheel 56, a pawl 76 is pivotally carried by the ratchet arms 20 on a pin 78 extending through the arms 20. The pawl 76 has a hooked end or catch 80 constructed to engage one tooth 60 at a time when the ratchet arms 20 are moved in one direction relative to the ratchet wheel 56. The pawl 76 is preferably yieldably biased into engagement with the periphery of the ratchet wheel 56 by a spring biased plunger 82 received in a pocket 84 formed in the connecting block 66 and acting on a lever portion 86 of the pawl 76 spaced from the pivot pin 78 and the catch 80. The spring biased plunger 82 tends to rotate the pawl 76 about its pivot pin 78 to force the catch 80 into engagement with the periphery of the ratchet wheel 56 so that the catch 80 engages a tooth 60 of the ratchet wheel 56 when circumferentially aligned therewith.

The drive wheel 24 is axially spaced from the ratchet wheel 56 and fixed to the main shaft 22 for co-rotation with the main shaft 22 and ratchet wheel 56. The drive wheel 24 is preferably generally circular and coaxial with the main shaft 22. Four rollers 26a–26d are rotatably carried on the drive wheel 24 generally near an outer edge of the drive wheel 24. As best shown in FIG. 2, each roller 26a–26d preferably has a stub shaft 90 extending through the drive wheel 24 and secured thereto by a nut 92 on one end of the shaft 90. An enlarged circular roller head 94 is journalled for rotation on the other end of the shaft 90 by bearings received between the roller head 94 and shaft 90 to permit rotation of the roller head 94 relative to the shaft 90 and the drive wheel 24. The four rollers are equally circumferentially about the drive wheel and equally radially spaced from the axis of rotation of the drive wheel 24. As shown in FIGS. 2–5, detents or notches 96 are formed in the periphery of the drive wheel 24 and are equally circumferentially spaced apart.

A detent mechanism 98 has an arm 100 pivotally carried on a pin 102 received through uprights 104 fixed to a plate 105 attached to the base 38 of the indexing drive frame 36. A roller 106 constructed to be received in the notches 96 formed in the drive wheel 24 when aligned therewith, is rotatably carried by a pin 108 received through a pair of fingers 110, 112 of the arm 100. The arm 100 is preferably yieldably biased, such as by a spring biased plunger 114, into engagement with the periphery of the drive wheel 24 so that the roller 106 is forced into one of the notches 96 of the drive wheel 24. With the roller 106 received in a notch 96 of the drive wheel 24, the detent mechanism 98 will inhibit rotation of the drive wheel 24 when forces below a threshold force act on the drive wheel 24 tending to rotate it.

The follower wheel 28 is fixed to the output shaft 30 for co-rotation with the output shaft 30 and has elongated slots 120 formed in one face 122 extending at a right angle to one another and intersecting each other to define a generally "+"-shaped recess with four openings 124 equally circumferentially spaced about the periphery of the follower wheel 28. Each slot 120 and opening 124 is sized to closely receive the roller head 94 of a roller 26a–26d therein and the follower wheel 28 is driven for rotation by engagement of at least one of the roller heads 94 with one of the slots 120 in the follower wheel 28 in response to rotation of the drive wheel 24.

The output gear 32 or sprocket is axially spaced from the follower wheel 28 and fixed to the output shaft 30 for co-rotation with the output shaft 30. The output gear 32 preferably has a plurality of teeth 130 extending from its periphery which are constructed to engage a drive linkage such as a chain 132 (FIG. 1) which is also received on a sprocket of the drive mechanism 34 of an apparatus such as the indexing conveyor 12 of FIG. 1. Thus, rotation of the follower wheel 28 rotates the output shaft 30 and the output gear 32 to drive the indexing conveyor 12 as described more fully hereinafter.

Operation

The indexing drive 10 provides an intermittent, discrete increment of rotation of the output shaft 30 to provide a discrete movement of an apparatus connected to the output gear 32 or otherwise connected to the output shaft 30. To provide this movement, the actuator 50 drives the ratchet arms 20 between their first and second positions, corresponding to the extended and retracted positions of the actuator rod 52.

As the ratchet arms 20 are driven from their first position, shown in FIG. 3, to their second position, shown in FIG. 4, the pawl 76 engages a tooth 60 and drives the ratchet wheel 56, and hence, the main shaft 22 and drive wheel 24, for rotation in a clockwise direction as viewed in FIGS. 3 and 4. This stoke is generally referred to as the "index stroke" and causes an indexed rotation of the output shaft 32 in a counter-clockwise direction and an indexed movement of the conveyor 12. With the indexing drive 10 constructed and arranged as described, each index stroke of the ratchet arms 20 rotates the main shaft 22 and output shaft 32 approximately 90 degrees. To "reset" the ratchet arms 20 to their first positions to engage the next consecutive tooth 60 on the ratchet wheel 56, the actuator rod 52 is returned to its extended position (FIG. 3) causing the ratchet arms 20 to rotate relative to the main shaft 22 and ratchet wheel 56. The plunger 82 biasing the pawl 76 maintains the catch 80 in engagement with the ratchet wheel 56 and ensures that the pawl 76 will engage the next tooth 60 when aligned therewith.

Figure 5:
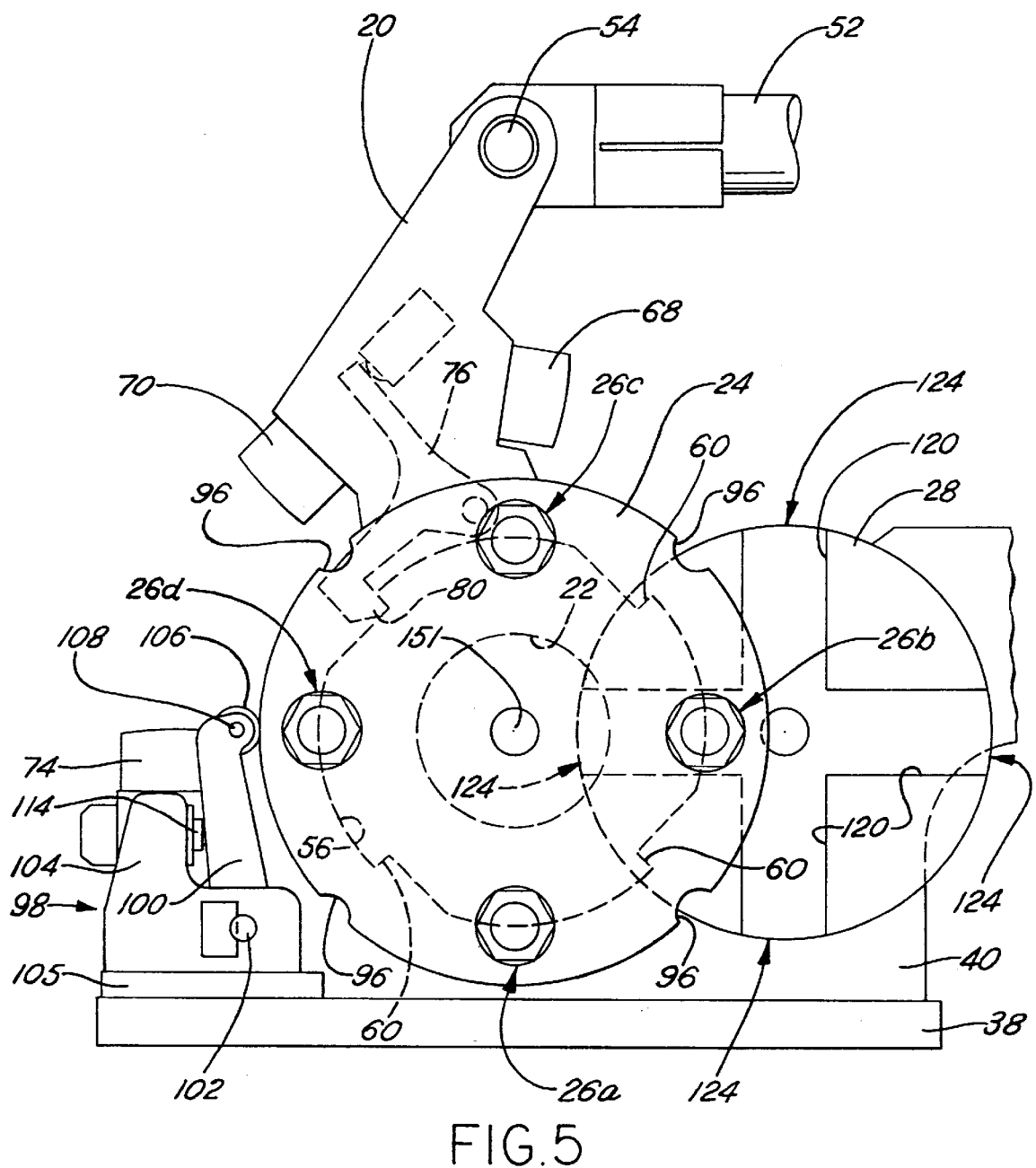
FIG. 5 is a diagrammatic view of a ratchet arm, ratchet wheel and follower of the indexing drive of FIG. 2 shown in an intermediate position during an index stroke of the indexing drive.

As best shown in FIGS. 3–5, the rotation of the drive wheel 24 during an index stroke of the ratchet arms 20 causes one roller 26b to further enter its slot 120 in the follower wheel and another roller 26a to move out of engagement with the drive wheel 24. The roller 26b which is received further within its associated slot travels generally radially inwardly of the follower wheel 28 for one-half of the rotation of the drive wheel 24 and follower wheel 28 during an index stroke (equal to 45 degrees of rotation of the drive wheel 24 and follower wheel 28) as shown in FIG. 5. For the second-half of the index stroke, the roller 26b moves generally radially outwardly of the follower wheel 28 to the position shown in FIG. 4. As shown in FIG. 4, after that index stroke, roller 26c is now engaged with the follower wheel 28 and subsequent index strokes will move the next consecutive rollers 26a–26d into and out of engagement with the follower wheel 28 in the same manner. Desirably, at least one roller 26a–26d is engaged with the follower wheel at all times to prevent rotation of the follower wheel without a corresponding rotation of the drive wheel 24.

When the ratchet arms 20 are not within an index stroke (i.e. the ratchet arms 20 are either at their first position (FIG. 3) or their second position (FIG. 4) or are being moved from their second position towards their first position), two of the rollers 26a–26d are partially received in separate openings 124 in the follower wheel 28. Desirably, any force by the conveyor 12 tending to rotate the follower wheel 28 in either a clockwise or counterclockwise direction (as viewed in FIG. 4) in between index strokes acts on both rollers (rollers 26b and 26c as shown in FIG. 4) engaged with the follower wheel 28 along lines 150 and 152 substantially perpendicular to the axis of rotation 151 of the main shaft 22. Thus, rotation of the follower wheel 28 is prevented because the force tending to rotate the follower wheel 28 does not produce any force or torque tending to rotate the drive wheel 24 which is connected to the follower wheel 28 through the rollers 26a–26d. Additionally, while the pawl 76 is engaged with a tooth 60 of the ratchet wheel 56, counter-clockwise rotation of the ratchet wheel 56, and hence, the main shaft 22 and drive wheel 24, is resisted.

To maintain the desired angular relationship between the drive wheel 24 and follower wheel 28 to prevent rotation of the follower wheel 28 in between index strokes, the roller 106 of the detent mechanism 98 is received in a notch 96 in the drive wheel 24 to resist rotation of the drive wheel 24. The detent mechanism 98 only needs to apply a small force to the drive wheel 24 to hold it in this desired angular position. The force applied to the drive wheel 24 by the detent mechanism 98 is readily overcome by the force tending to rotate the drive wheel 24 provided by the ratchet arms 20 during an index stroke.

Those skilled in the art will appreciate that various modifications may be made without departing from the scope and spirit of the appended claims. For instance, the teeth 60 may be provided on the main shaft 22 or drive wheel 24, without any separate ratchet wheel 56. Further, the rollers 26a–26d may be disposed on the ratchet wheel with minor modifications to the orientation of various other components. Still further, the actuator 50 may be a hydraulic cylinder, a ball screw driven by an electric motor, or some other device instead of the presently preferred pneumatic cylinder disclosed. The output shaft 30 and output gear 32 may be indexed in other than 90 degree increments such as 60 degree or 45 degree increments by using six or eight, respectively, equally circumferentially spaced rollers 26 and cooperating equally circumferentially spaced slots 120.

What is claimed is:
1. An indexing drive, comprising:
a frame;
a main shaft rotatably carried by the frame;
a ratchet arm pivotally carried by one of the main shaft and the frame for movement relative to the frame between first and second positions;
an actuator connected to the ratchet arm to move the ratchet arm between the first and second positions;
at least two spaced apart teeth carried by the main shaft and constructed to be engaged by the ratchet arm in one direction of movement of the ratchet arm to rotate the main shaft;
at least two rollers equally circumferentially spaced apart and assembled in a fixed relation relative to the main shaft for co-rotation with the main shaft; and
a follower rotatably carried by the frame and having slots to receive at least a portion of one of said roller such that upon movement of the rollers they engage the follower from within the slots to cause rotation of the follower whereby, as the ratchet arm is moved from its second position to its first position the ratchet arm moves relative to the main shaft and becomes engaged with one of the teeth and as the ratchet arm is moved from its first position to its second position, the ratchet arm causes a discrete amount of rotation of the main shaft and rollers to thereby cause a predetermined amount of rotation of the follower which may be used to drive an apparatus.

2. The indexing drive of claim 1 which also comprises an output shaft on which the follower and an output driving mechanism are fixed for co-rotation with the output shaft, the output driving mechanism being adapted to provide an output for a drive mechanism of an apparatus.

3. The indexing drive of claim 2 wherein the output driving mechanism is a sprocket adapted to drive a chain received on the sprocket to drive said drive mechanism of said apparatus.

4. The indexing drive of claim 2 wherein the output shaft is spaced from and generally parallel to the main shaft and the rollers engage the follower between the output shaft and main shaft such that the in use, the main shaft and output shaft rotate in opposite directions.

5. The indexing drive of claim 1 which also comprises a drive wheel fixed to the main shaft for co-rotation with the main shaft and on which the rollers are received and a ratchet wheel fixed to the main shaft for co-rotation with the main shaft and on which the teeth are received.

6. The indexing drive of claim 5 which also comprises a detent mechanism and wherein the drive wheel has at least two equally circumferentially spaced notches formed in its periphery and constructed to be engaged by the detent mechanism to releasably hold the main shaft in a predetermined position.

7. The indexing drive of claim 6 wherein the detent mechanism has an arm with a catch which is yieldably biased into engagement with the periphery of the drive wheel to force the catch into one of said notches when said notch is rotated into alignment with the catch.

8. The indexing drive of claim 5 which also comprises a second ratchet arm, each ratchet arm connected together and driven in unison by the actuator between first and second positions with one ratchet arm disposed on each of a pair of opposed sides of the ratchet wheel.

9. The indexing drive of claim 1 wherein the follower has four equally circumferentially spaced radial slots formed in a side face of the follower providing four openings equally circumferentially spaced around the perimeter of the follower and four rollers are provided with each roller equally circumferentially spaced and constructed to be rotated into an opening of the follower as the main shaft and follower are rotated.

10. The indexing drive of claim 9 wherein at least one roller is engaged with the follower at all times.

11. The indexing drive of claim 9 which also comprises a drive wheel fixed to the main shaft and to which the rollers are attached, the rollers are positioned on the drive wheel such that when the ratchet arm is in its first position a force applied to the follower, tending to rotate the follower, acts on a roller engaging the follower along a line intersecting the axis of rotation of the main shaft to prevent rotation of the follower.

12. The indexing drive of claim 11 wherein when the ratchet arm is in its first position, two rollers are at least partially received in slots in the follower such that a force tending to rotate the follower in either direction acts on each of said two rollers along lines intersecting the axis of rotation of the main shaft to prevent rotation of the follower when the main shaft is not being rotated by the ratchet arm.

13. The indexing drive of claim 12 which also comprises a detent mechanism and wherein the drive wheel has at least two equally circumferentially spaced notches formed in its periphery and constructed to be engaged by the detent mechanism to releasably retain the drive wheel and main shaft in a predetermined position.

14. The indexing drive of claim 1 which also comprises a pair of stops carried by the frame in a position to limit the movement of the ratchet arm in each of a pair of opposed directions and to define the first position and second position of the ratchet arm when engaged by the ratchet arm.

15. The indexing drive of claim 14 which also comprises a pair of stops carried by the ratchet arm with each stop carried by the ratchet arm constructed to engage a separate stop carried by the frame.

16. The indexing drive of claim 1 which also comprises a pawl carried by the ratchet arm and being yieldably biased into engagement with a surface on which the teeth are carried.

17. The indexing drive of claim 1 wherein the main shaft is rotated approximately 90 degrees as the ratchet arm is moved from its first position to its second position.

18. The indexing drive of claim 1 wherein the output driving mechanism is constructed to communicate with a drive mechanism of a conveyor such that rotation of the output driving mechanism causes an indexed movement of the conveyor.

19. The indexing drive of claim 1 wherein the actuator is a pneumatic cylinder having an actuating rod pivotally connected to the ratchet arm to permit pivotal movement of the ratchet arm relative to the actuating rod.

* * * * *